R. B. ISEMAN.
TURN TABLE.
APPLICATION FILED APR. 16, 1917.
1,234,033.
Patented July 17, 1917.
3 SHEETS—SHEET 1.
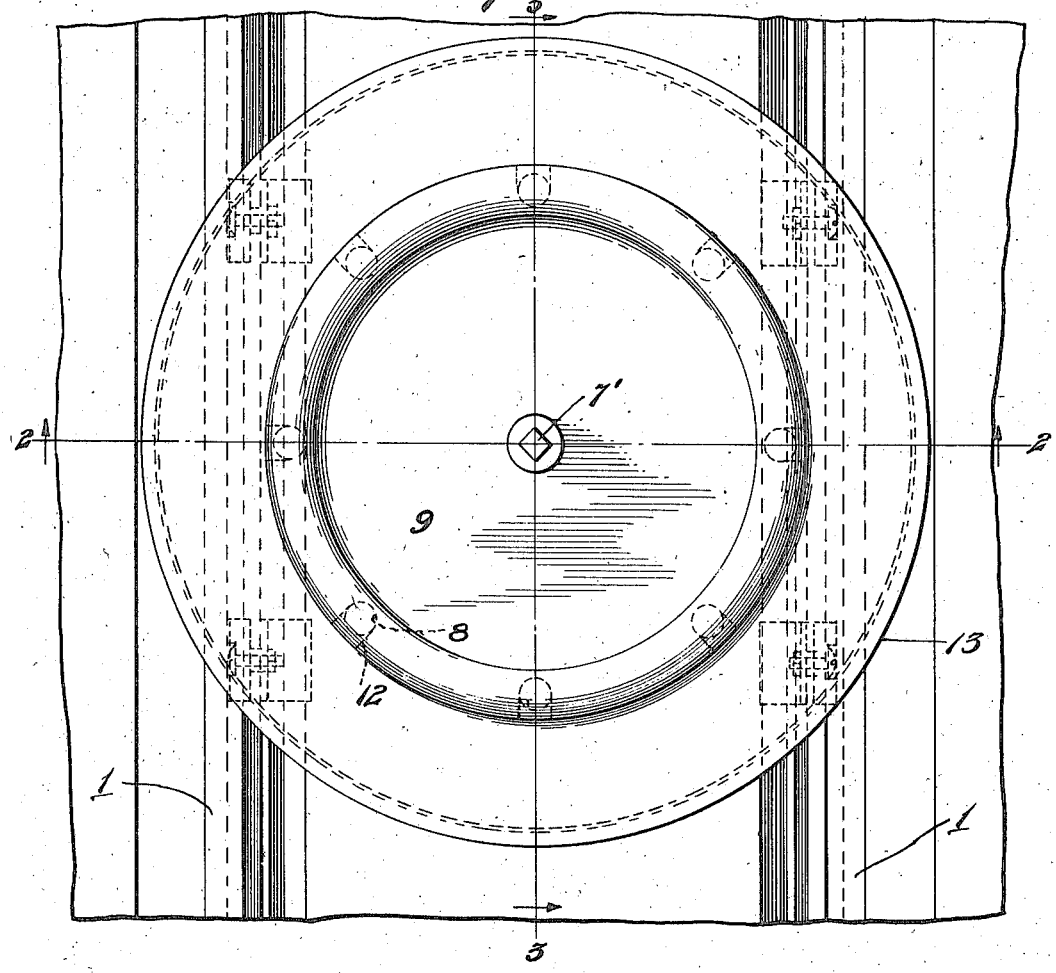
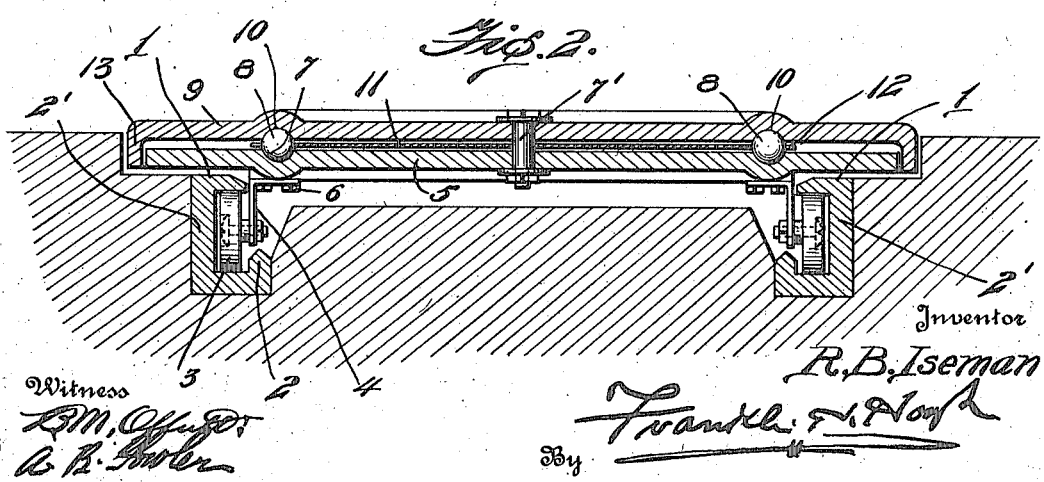
Inventor
R. B. Iseman R. B. ISEMAN.
TURN TABLE.
APPLICATION FILED APR. 16, 1917.
1,234,033.
Patented July 17, 1917.
3 SHEETS—SHEET 2.
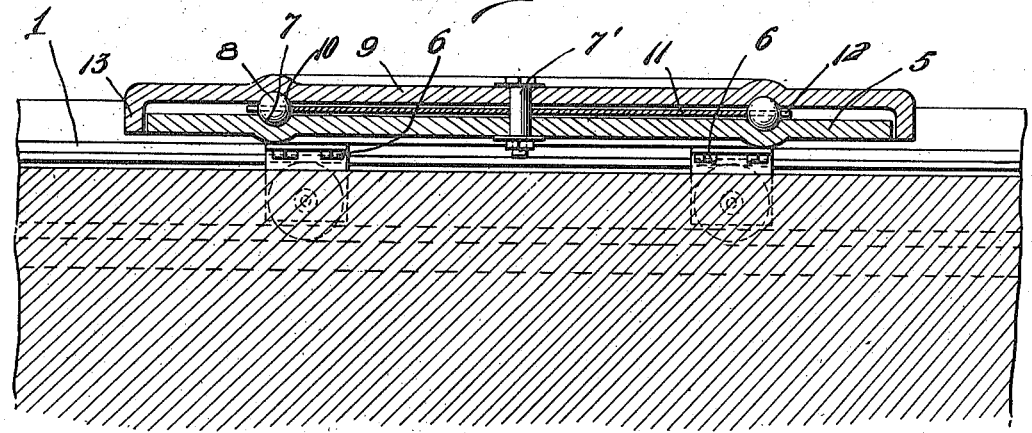
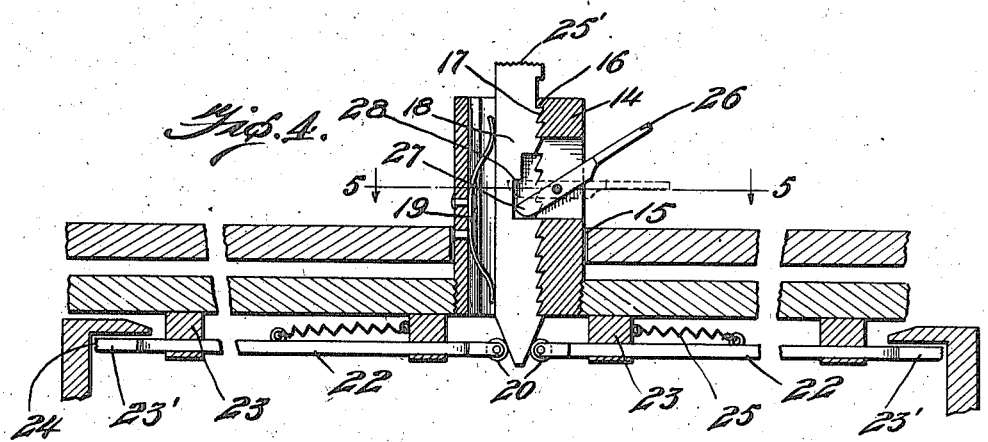
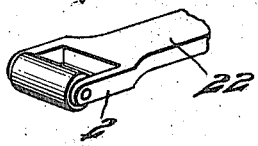
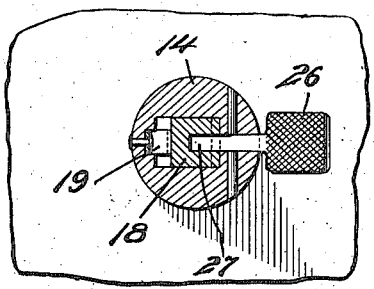
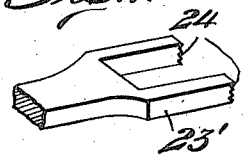
Witness
Inventor
R. B. Iseman
By
Attorney R. B. ISEMAN.
TURN TABLE.
APPLICATION FILED APR. 16, 1917.
1,234,033.
Patented July 17, 1917.
3 SHEETS—SHEET 3.
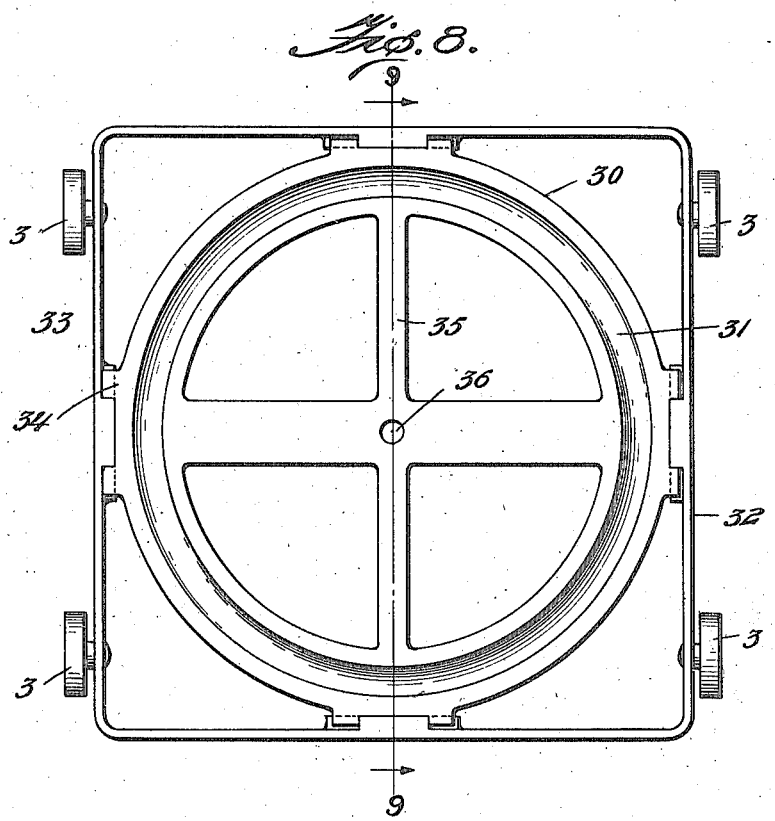
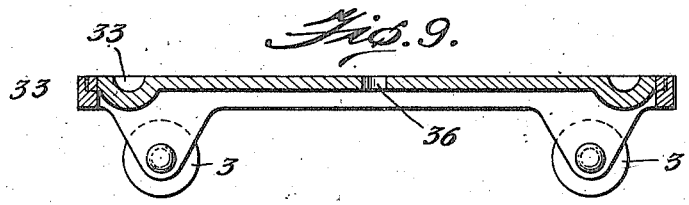
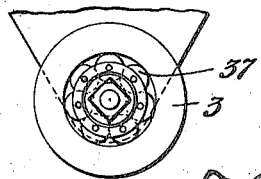
Inventor
R. B. Iseman

UNITED STATES PATENT OFFICE.

RICHARD B. ISEMAN, OF VANDERGRIFT, PENNSYLVANIA.

TURN-TABLE.

1,234,033.

Specification of Letters Patent.

Patented July 17, 1917.

Application filed April 16, 1917. Serial No. 162,420.

*To all whom it may concern:*

Be it known that I, RICHARD B. ISEMAN, a citizen of the United States, residing at Vandergrift, in the county of Westmoreland and State of Pennsylvania, have invented certain new and useful Improvements in Turn-Tables; and I do hereby declare the following to be a full, clear, and exact description of the invention, such as will enable others skilled in the art to which it appertains to make and use the same, reference being had to the accompanying drawings, and to the letters and figures of reference marks thereon, which form a part of this specification.

This invention relates to new and useful improvements in turn tables and more particularly to such devices designed for use in garages and similar places for handling automobiles.

The main object of the invention is to economize in space in a garage, either public or private, to the fullest extent, by providing a portable turn table capable of traveling bodily in a garage, upon a track, said track being embedded in the floor of a garage, so that said turn table can be moved upon said track, between two rows of stalls or parking space to the desired stall or parking space, within a garage, wherein an automobile is then parked or to be parked; upon which said turn table an automobile may then be placed and by giving said turn table a quarter turn around an automobile can then be run or operated, either forward or backward, from or into the desired parking space or stall with great ease and celerity, and for general use in a garage for the convenient turning and handling of automobiles.

Another object of the invention is to provide a locking device for locking the turn table against movement, while a machine is being moved thereon or therefrom.

I illustrate my invention in the accompany drawings, in which:

Figure 1 is a plan view of the turn table. Fig. 2 is a sectional view on line 2—2 of Fig. 1. Fig. 3 is a sectional view on line 3—3 of Fig. 1. Fig. 4 is a sectional view similar to Fig. 3, showing a modified form of pivot for the turntable. Fig. 5 is a sectional view of the pivot, taken on line 5—5 of Fig. 4. Fig. 6 is a detail view of one end of one of the locking rods, having a friction roller applied thereto. Fig. 7 is a detail perspective view of the opposite end of one of the locking rods. Fig. 8 is a modified form of the supporting table. Fig. 9 is a sectional view on line 9—9 of Fig. 8. Fig. 10 is a detail view of one of the wheels showing the roller bearings over which the same operates.

Reference now being had to the details of the drawings by numeral, 1 designates a track embedded in the floor of a building and lying below the surface thereof in order that the turn table, supported thereon, will lie flush with the floor surface. As shown, the track 1 comprises parallel rails 2', each of which is provided with an upwardly extending flange 2 acting as keepers for the wheels 3 mounted on roller bearings 3' and operating on the rails 2', said wheels being supported by depending brackets 4 bolted to the underside of the circular base 5, by suitable bolts 6. The upper surface of the circular base 5 is provided with an annular groove 7 forming a runway for the ball bearings 8 which support the circular revolving table 9, which also has an annular groove 10 formed on the under side thereof, also engaging the balls 8 for revolubly supporting the table 9. Disposed between the base 5 and revolving table 9 is a rotary disk-like keeper 11 having cut-out portions 12 formed in the periphery thereof, each cut-out portion 12 being of a size to receive one of the ball bearings 8, and retain them in proper spaced relation with each other. The periphery of the revolving table 9 is turned downwardly as at 13, and overlaps the outer edge of the circular base 5, thereby preventing articles from becoming wedged between the circular base 5 and revolving table 9. In this form of turntable a pivot, such as a bolt 7', is employed for securing the base and revolving table together.

In the modified form of pivot as shown, I have provided a pivot 14, threaded or otherwise secured to the circular base 5, centrally thereof, and extending upwardly through an opening 15 formed in the revolving table 9, thereby forming a central bearing for the revolving table 9 for preventing lateral displacement thereof. The inner wall of the pivot 14 is provided with suitable teeth 16 adapted to coöperate with teeth 17 formed on the vertically movable pin 18, the teeth 16 and 17 being forced into coöperative relation with each other by the action of a leaf spring 19, bolted at its central portion to the inner wall of the pivot 14, the free ends of the spring engaging the rear surface of the pin 18.

The lower extremity of the pin 18 is tapered to provide cam surfaces coöperating with anti-friction rollers 20 positioned between the arms 21 of the respective locking rods 22, and it is obvious that vertical movement of pin 18 results in a horizontal movement of the locking rods 22. These locking rods 22 operate in suitable guides 23 depending from the under side of the circular base and the outer ends thereof are bifurcated as at 23', the extreme ends of the bifurcations being serrated as at 24 to bite into the rails 2', when the locking rods 22 are moved in one direction, and thereby lock the table against movement.

After the locking rods 22 have been moved to their locked position, the teeth 16 and 17 coöperate to hold said locking rods in such position against the tension of the coiled springs 25, which have one of their ends secured to the respective locking rods 22, while the opposite ends thereof are anchored to the respective guides 23. In order to release the teeth 16 and 17, it is necessary to move the arm 26 downwardly, which movement results in the inner end 27 thereof engaging the wall of the cut out portion 28 of the pin 18 with the result that the pin 18 is moved inwardly against the tension of the spring 19, the springs 25 then moving the locking rods 22 out of contact with the rails 2'. The device may then be moved to any position along the rails 2' of the track 1.

In order to operate the locking rods 22, to move them to their operative position, it is only necessary to press downwardly on the portion 25' of the pin 18, the members 24 being then moved into contact with the rails 2'.

In the modified form, as shown in Fig. 8, I have disclosed a circular base in which I do away with the circular disk, as shown in Figs. 1 and 2 of the drawings, and provide a circular element 30, provided with the annular groove 31 to receive the ball bearings, as shown in Fig. 2. In this form of device, it will be seen that the frame 32, which supports the member 30, is provided with lugs 33 which support and engage lugs 34, provided on the periphery of the element 30 for balancing the same and preventing movement thereof with relation to the frame 32. It will also be seen that in this form of invention the sides of the circular element 30 are connected by cross arms 35 and provided with a circular opening 36 to receive the usual pivot pin.

As clearly shown in Fig. 10, it will be seen that the supporting wheels 3 are mounted on roller bearings 37 but it is, of course, obvious that these bearings may be replaced by balls.

What I claim to be new is:—

1. In a turn table, a track, a circular base having wheels operating on the track, a revolving table supported on the circular base, a hollow pivot extending through the revolving table, locking rods for preventing movement of the turn table, and means extending through the hollow pivot for operating the locking rods.

2. In a turn table, a track, a circular base having wheels operating on the track, a revolving table on the base, ball bearings positioned between the base and revolving table, a spacing disk interposed between the base and revolving table, said disk having cut out portions to receive the ball bearings for holding them in spaced relation with each other, and locking means for locking the turn table in predetermined positions along the track.

3. In a turn table, a track, a circular base, means on the circular base for moving over said track and supporting the base, a revolving table supported on the base, ball bearings positioned between the base and revolving table, means engaging the ball bearings for holding the same in spaced relation with each other, and a pivot pin for securing the base and revolving table together.

4. In a turn table, a track, a circular base having wheels operating on the track, depending brackets secured to the base and supporting the wheels, the base having an annular groove formed in the upper surface thereof, a revolving table supported by the base and having an annular groove in the under surface thereof coöperating with the first mentioned groove for providing a runway, ball bearings positioned in the runway, a disk-like member interposed between the face and revolving table and having cut out portions forming pockets for the ball bearings for holding the same in spaced relation, and means for securing the base and revolving table together to permit rotary movement of the table with relation to the base.

5. In a turn table, a track, a circular base having wheels operating on the track, a revolving table, a hollow pivot extending through the revolving table, locking rods carried by the under side of the base and adapted to move horizontally with relation thereto, a vertically movable pin positioned within the hollow pivot, the lower extremity thereof tapering to provide cam surfaces, said cam surfaces adapted to coöperate with one end of each of the locking rods for moving the same horizontally, and means for operating the vertically movable pin.

6. In a turn table, a track, a circular base having wheels operating on the track, a revolving table supported on the circular base, a hollow pivot extending upwardly through the revolving table, teeth formed on the inner wall of said pivot, a vertically movable pin positioned within the hollow pivot and having teeth adapted to coöperate with the teeth formed on the inner wall of the hollow pivot, means for forcing the teeth into coöperative relation, locking rods carried by the under side of the circular base, one end of each locking rod having teeth, the opposite ends of the respective locking rods having roller bearings, and means for holding the lower extremity of the vertically movable pin between the rollers of the respective locking rods for moving the latter and causing the teeth to engage the track.

7. In a turn table, a track, a circular base having wheels operating on the track, a revolving table supported on the circular base, a hollow pivot connected to the circular base and extending upwardly through the revolving base, locking rods carried by the under side of the circular base, a vertically movable pin in the pivot, means for moving the pin to operate the locking rods, teeth on the vertically movable pin adapted to coöperate with teeth on the inner wall of the pivot, means for forcing the teeth into coöperative relation, and a lever adapted to move the pivot pin for disengaging the teeth.

8. In a turn table, a track, a circular base having wheels operating on the track, ball or roller bearings positioned in the wheels operating on the track, a revolving table on the base, ball bearings positioned between the base and revolving table, a spacing disk interposed between the base and revolving table, said disk having cut out portions to receive the ball bearings for holding them in spaced relation with each other, and locking means for locking the turn table in predetermined position along the track.

In testimony whereof I hereunto affix my signature in the presence of two witnesses.

RICHARD B. ISEMAN.

Witnesses:
CAMILLA E. WILSON,
J. V. FRAMPTON.